United States Patent [19]

Vasquez

[11] Patent Number: 4,626,145

[45] Date of Patent: Dec. 2, 1986

[54] GOLDSMITH'S WAX RING PRE-FORM SIZING TOOL

[76] Inventor: Eduardo C. Vasquez, 117 NE. 1st Ave., #1522, Miami, Fla. 33132

[21] Appl. No.: 744,524

[22] Filed: Jun. 14, 1985

[51] Int. Cl.⁴ .................. B23B 41/00; B23B 45/06
[52] U.S. Cl. .................................. 408/196; 408/201
[58] Field of Search ............... 30/310, 300; 408/82, 408/116, 196, 198, 201, 239 R

[56] References Cited

U.S. PATENT DOCUMENTS

| | | | |
|---|---|---|---|
| 1,330,915 | 2/1920 | Skinner | 408/201 X |
| 1,487,533 | 3/1924 | Bryan | 408/196 X |
| 1,591,148 | 7/1926 | Walrath | 408/196 X |
| 2,226,226 | 12/1940 | Hedin | 408/201 |
| 2,937,545 | 5/1960 | Rauer et al. | 408/201 |
| 4,036,674 | 7/1977 | Labenz | 30/310 X |
| 4,043,699 | 8/1977 | Farrand | 408/196 X |

Primary Examiner—Frank T. Yost
Attorney, Agent, or Firm—Richard C. Litman

[57] ABSTRACT

A tool for precisely sizing wax ring pre-forms used by jewelers and goldsmiths in the manufacture of hand carved jewelry which is readily adjustable to the desired ring size and which is then hand operated to scrape the wax preform to the desired diametral dimension and required depth to obtain a wax ring pattern for the ring to be fashioned. The wax ring pattern having the correct ring size is then separated from the wax ring pre-form stock for further crafting by the goldsmith to shape the exterior of the ring to its desired configuration.

3 Claims, 5 Drawing Figures

GOLDSMITH'S WAX RING PRE-FORM SIZING TOOL

BACKGROUND OF THE INVENTION

In the making of hand-carved wax ring patterns for subsequent investment casting in precious metals it is customary for the jeweler or goldsmith to start with a wax ring pre-form in the form of a thick walled cylinder or ring-shaped cylinder. These wax ring pre-forms are supplied to the trade as cylinders approximately 8 inches long and having a bore diameter, smaller than the smallest practicable ring size—typically 0.605".

In the past, the procedure has been for the jeweler or goldsmith to cut the required length of wax (the width of the desired ring pattern) from the wax ring pre-form cylinder and to then proceed to hand enlarge the bore to the required ring size by filing and scraping the wax from the bore. This is a time consuming and tedious operation and it is difficult for the artisan to maintain perfect concentricity.

Because of the semi-crystalline nature of waxes, particularly the harder waxes employed for making ring pre-forms, cutting or trying to bore the pre-form to the required dimension using conventional metal or wood working cutting tools is not practical. The tools tend to jam in the wax because they take too big a 'bite' or fracture the wax for the same reason. Conventional tools cannot be employed for a more basic reason; they are not made in the sizes which jewelers employ to measure fingers for rings. A ring is sized to a client's finger by employing ring gauges which are a series of rings of graduated sizes, arbitrarily numbered from 1 to 13 with half and quarter sizes, and fitting the ring gauges on the finger until a ring gauge is found that is comfortable and readily fits the particular finger on which the client desires to wear the ring. A tapered mandrel bearing numbers corresponding to the ring gauges is then employed by the jeweler or goldsmith to size the interior of the wax ring pattern. Regrettably the ring gauges and mandrels furnished by different manufacturers may not be completely interchangeable and each jeweler or goldsmith generally employs a single set comprising the ring gauges and the mandrel furnished by one manufacturer thereof.

Because the ring mandrel is tapered, when the jeweler or goldsmith is sizing the wax ring pattern, cut from the wax ring pre-form, with hand tools he must fit and refit the wax pattern on the mandrel after each scraping or filing operation to assure that he is finally obtaining a size that just fits the ring size marking on the mandrel, a time consuming process.

SUMMARY OF THE INVENTION

The present invention discloses a tool which the goldsmith can use to dimension the wax ring pattern to precisely the required ring size while it is still a part of the wax ring pre-form cylinder and can dimension it to the correct depth, which is the width of the ring to be fashioned, at the same time. Through use of the tool disclosed he will obtain a perfectly concentric hole of the correct ring size in the wax ring pre-form. He may then cut the dimensioned wax ring pattern from the wax ring pre-form cylinder and procede with the process of fabricating the exterior of the wax ring pattern, placing the dimensioned wax ring pattern on a mandrel and shaping the desired exterior configuration.

BRIEF DESCRIPTION OF THE DRAWINGS

Referring now to the drawings in which like numbers are use to describe like parts throughout.

DESCRIPTION OF THE PREFERRED EMBODIMENTS

Figure 1:
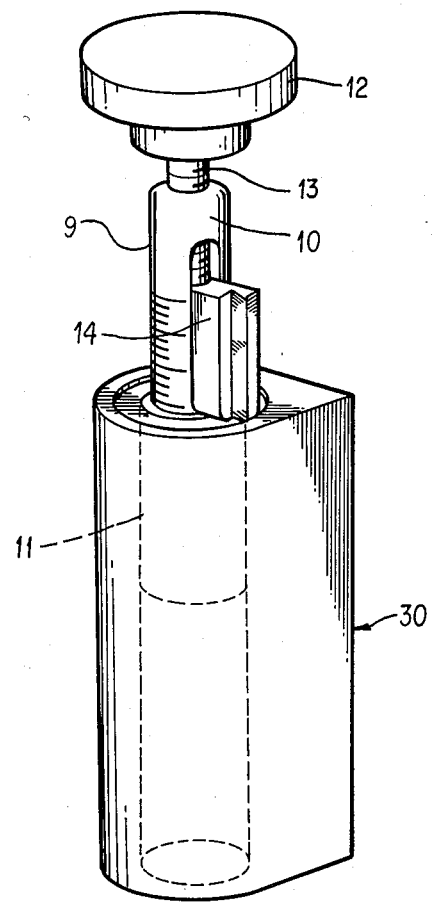
FIG. 1 is a perspective view of the tool in operation.

Referring now to the drawings and particularly to FIG. 1, there is shown a goldsmith's wax ring pre-form sizing tool 9 as it would appear in operation. A body member 10 is connected to a pilot member 11 which is shown as it would be in use inserted into the bore of a wax ring pre-form 30. Body 10 has a slot therein for receiving a scraping blade 14 which is provided with a relieved scraping portion 16. Handle 12 and screw 13 secure the scraping blade 14 in the desired radial position in the body and provide the means to operate the tool. The actual scraping surface is only the lower edge 17 of the relieved portion 16 of the blade. As handle 12 is turned and the tool is gently forced into the ring pre-form, the scraping edge 17 of blade 14, in contact with the horizontal surface of wax ring pre-form 30, removes a continuous thin shaving of wax, creating a larger hole in the ring pre-form which is perfectly concentric with the original bore of the pre-form. The larger hole is the desired ring size of the ring which is subsequently to be cast from the wax pattern to be created. When the larger hole is of is of sufficient depth (the width of the ring pattern to be made), as shown by the indicia on the body of the tool, the tool is removed and the wax ring pattern is cut from the ring pre-form for subsequent carving and forming the exterior of the ring, FIG. 2 shows a detail of the tool 9 as it would be used, with only the relieved portion 16 of the blade bearing scraping edge 17 of Blade 14 extending beyond the pilot member 11 of the tool.

Figure 3:
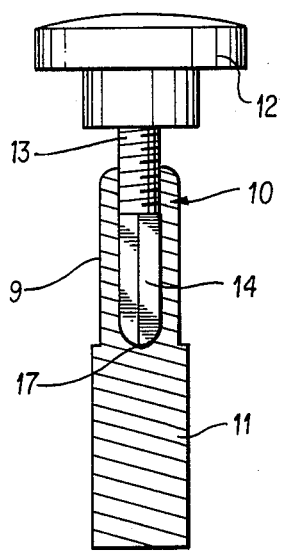
FIG. 3 is a sectional elevation view of the tool.

FIG. 3 shows the detail of the slot in body member 10 with blade 14 mounted therein.

Figure 2:
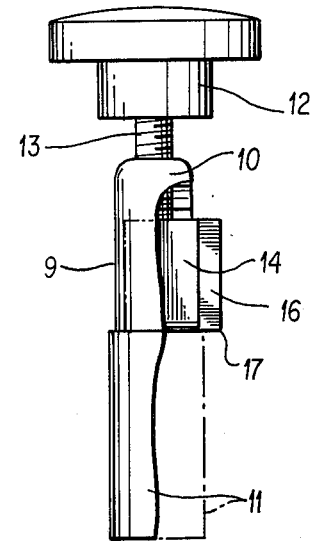
FIG. 2 is a partial orthographic cutaway view of the tool.
Figure 4:
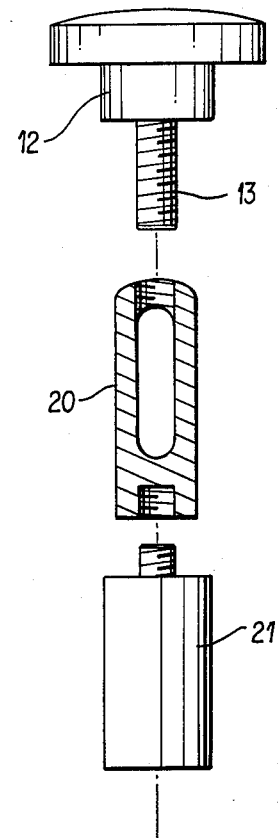
FIG. 4 is a partial section exploded view of the tool having a separate pilot member.

While most wax ring pre-forms provided to the trade in this country have a standard bore size which would roughly correspond to a ring size 4, and the tool as shown in FIGS. 1,2 & 3, with the pilot member and the body member formed as a single element may be employed for these standard pre-forms, the version of the tool shown in FIG. 4 may be used to adapt the tool to foreign ring pre-forms or non standard ring pre-forms. Body member 20 and pilot member 21 are separable and a variety of different sized pilot members may be provided to adapt the tool to fit ring pre-forms having any bore size whatever.

Figure 5:
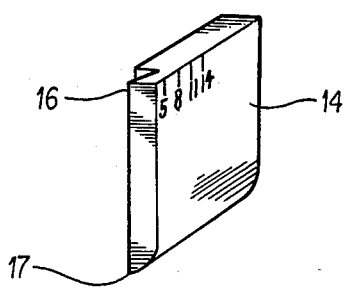
FIG. 5 is a perspective view of the scraping blade.

FIG. 5 shows a detail of blade 14 showing indicia which may be used to provide a rough setting for the blade. Shown here greatly expanded, for clarity, they would actually be confined to just the relieved portion 16 having scraping edge 17. While the indicia may be employed for roughly setting the blade in the handle the goldsmith would employ a vernier caliper to obtain the final precise setting of the blade in order to create a wax pattern which, when finally cast, would provide a ring which would exactly fit the client's finger.

While I have shown the several embodiments of the present invention known to me, it is understood that other changes or modifications may be made by those skilled in the art and I desire not to be limited to the particular details shown but to cover all such modifications as may be encompassed by the scope of the following claims.

What is claimed is:

1. A wax ring pre-form sizing tool comprising:

a pilot member for slideably engaging the bore of a wax ring pre-form; a body member attached to said pilot member, said body member having a radial slot therein for receiving a scraping blade; a scraping blade having a scraping surface developed by relieving one half of the thickness of a portion of said blade and creating a scraping surface having a flat forward scraping edge and a rounded trailing edge; a screw extending from the end of the body member to secure said scraping blade in a desired radial position and a handle attached to the opposite end of said screw for operating the tool, so that when the tool is inserted in a wax ring preform and rotated by means of the handle the scraping edge removes a shaving of wax therefrom, creating a bore of the desired ring size.

2. The wax ring pre-form sizing tool of claim 1 wherein the body member and pilot members of the tool are formed as an integral piece.

3. The wax ring pre-form sizing tool of claim 1 wherein the pilot member of the tool is connected to the body member by screw attachment.

* * * * *